(12) United States Patent
Morris

(10) Patent No.: US 8,226,415 B2
(45) Date of Patent: Jul. 24, 2012

(54) DISH CODING SYSTEM

(75) Inventor: Sarah Morris, Lehi, UT (US)

(73) Assignee: Sherry S. Loosli, Cedar Hills, UT (US)

( * ) Notice: Subject to any disclaimer, the term of this patent is extended or adjusted under 35 U.S.C. 154(b) by 309 days.

(21) Appl. No.: 12/483,082

(22) Filed: Jun. 11, 2009

(65) Prior Publication Data

US 2010/0015580 A1    Jan. 21, 2010

Related U.S. Application Data

(60) Provisional application No. 61/080,894, filed on Jul. 15, 2008.

(51) Int. Cl.
*G09B 19/00* (2006.01)

(52) U.S. Cl. ...................................................... 434/127

(58) Field of Classification Search .................. 434/127; 220/574, 575; 600/300; D7/551.1, 556
See application file for complete search history.

(56) References Cited

U.S. PATENT DOCUMENTS

| | | | | |
|---|---|---|---|---|
| D194,054 S | * | 11/1962 | Grossman | D7/556 |
| D200,867 S | * | 4/1965 | Haifley | D7/555 |
| 4,075,769 A | * | 2/1978 | Young | 434/127 |
| D281,849 S | | 12/1985 | Cantor | |
| 4,966,295 A | | 10/1990 | Parrish | |
| 5,007,743 A | | 4/1991 | Brennan | |
| 5,560,653 A | | 10/1996 | Beppu | |
| 6,296,488 B1 | | 10/2001 | Brenkus et al. | |
| 6,428,320 B1 | * | 8/2002 | Archuleta et al. | 434/127 |
| D494,012 S | * | 8/2004 | Bandy-Helderman | D7/553.6 |
| 7,044,739 B2 | * | 5/2006 | Matson | 434/127 |
| 7,201,579 B1 | * | 4/2007 | Boyum | 434/127 |
| 7,908,181 B2 | * | 3/2011 | Dotson | 705/26.5 |
| 2007/0245825 A1 | | 10/2007 | Curtis | |
| 2007/0289973 A1 | * | 12/2007 | Acosta et al. | 220/507 |

* cited by examiner

*Primary Examiner* — Kurt Fernstrom

(74) *Attorney, Agent, or Firm* — Schmeiser, Olsen & Watts LLP

(57) ABSTRACT

There is a dish coding system configured to discreetly represent serving portions on a dish. The dish coding system includes a dish, configured to support food thereon; and a plurality of decorative indicia visibly disposed across a top portion of the dish. The plurality of decorative indicia does not include any overt indication of a relationship between a decorative indicia characteristic and intended portions to be disposed thereon. The plurality of decorative indicia includes an indicator disposed on the top surface of the dish, configured to differentiate food serving portions. The dish coding system also includes an index associated with the dish and including an overt indication of a relationship between decorative indicia characteristics and intended portions to be disposed thereon. The index is visibly displayed on a bottom surface of the dish. The dish may be selected from the group consisting of; plates, bowls, glasses, cookware, pots, pans, cups, and dishes. The dish may be incorporated into a complete set of dinnerware.

12 Claims, 9 Drawing Sheets

DISH CODING SYSTEM

CROSS-REFERENCE TO RELATED APPLICATIONS

This invention claims priority, under 35 U.S.C. §120, to the U.S. Provisional Patent Application No. 61/080,894 to Sarah Morris filed on Jul. 15, 2008, which is incorporated by reference herein.

FIELD OF THE INVENTION

The present invention relates to dishes, specifically to a dish coding system and method configured to display a recommended food intake.

DESCRIPTION OF THE RELATED ART

The food guide pyramid was the previous nutritional guide (created at Tufts University School of Medicine) of the USDA, replaced in April 2005 by the new USDA nutrition advisory program titled "My Pyramid". The food guide pyramid was surprisingly not created with the involvement of the Department of Health and Human Services, which would be expected for most matters involving human health. This has resulted in criticism stating that the real purpose of the new recommendations is to improve the economic position of US grain producers and not the health of the population.

A Weight Loss Pyramid Made on the Model by BCM

The food guide pyramid, informally known as the food pyramid, and formally titled the Improved American Food Guide Pyramid, was published in 1992 to replace the earlier food groups classification system. Since that time there has been an epidemic increase in Type 2 diabetes which is now even afflicting a large and rapidly increasing number of children. The food guide pyramid suggested optimal nutrition guidelines for each food category, per day, using a mnemonic graphic of a pyramid with horizontal dividing lines, to represent suggested percentages of the daily diet for each food group.

The Grains Group—bread, cereal, rice, and pasta are grown from cereal crops. Cereals, breads, pastas, crackers, and rice all fall under this categorization. Grains supply food energy in the form of starch, and are also a source of protein. Whole grains contain dietary fiber, essential fatty acids, and other important nutrients. Milled grains, though more palatable, have many nutrients removed in the milling process and thus are not as highly recommended as whole grains. Whole grains can be found especially in oatmeal, brown rice, grits, corn tortillas and whole wheat bread. Six to eleven servings of grain products are recommended per day. Starch is the most valuable polysaccharide. The starch molecule is tree-like, with branches of varying length. Starch digestion begins in the mouth with salivary amylase, continuing in the small intestine with pancreatic amylase. Short chains of glucoses are referred to as alpha-dextrin, maltotriose (3GL), and maltose (2GL). Glucoamylase breaks these short chains down to individual glucose molecules which are absorbed. Starch is the best fuel, supplying sustained-release glucose.

Vegetable Group—a vegetable is a part of a plant consumed by humans that is generally savory (not sweet) and not considered grain, fruit, nut, spice, or herb. For example, the stem, root, flower, etc. may be eaten as vegetables. Vegetables contain many vitamins and minerals; however, different vegetables contain different spreads, so it is important to eat a wide variety of types. For example, green vegetables typically contain vitamin A, dark orange and dark green vegetables contain vitamin C, and bushy vegetables like broccoli and related plants contain iron and calcium. Vegetables are very low in fats and calories, but cooking can often add these. Three to five servings of vegetables in a day. They may be fresh, frozen, canned, or made into juices.

Fruit Group—in terms of food (rather than botany), fruits are the sweet-tasting seed-bearing parts of plants, or occasionally sweet parts of plants which do not bear seeds. These include apples, oranges, plums, and bananas, etc. Fruits are low in calories and fat and are a source of natural sugars, fiber and vitamins. Processing fruits when canning or making into juices unfortunately often adds sugars and removes nutrients; therefore fresh fruit or canned fruit packed in juice rather than syrup is recommended[citation needed]. The fruit food group is sometimes combined with the vegetable food group. It is best to consume tow to four servings of fruit in a day. They may be fresh, frozen, canned, dried, or made into juice.

Milk, Yogurt, and Cheese Group—dairy products are produced from the milk of mammals, most usually but not exclusively cattle. They include milk and yogurt and cheese. They are the best source for the mineral calcium, but also provide protein, phosphorus, vitamin A, and in fortified milk, vitamin D. However, many dairy products are high in fat, which is why skimmed products are available as an alternative. For adults, two to three servings of dairy products are recommended per day.

Meat, Poultry, Fish, Dry Beans, Eggs, and Nuts Group—meat is the tissue—usually muscle—of an animal consumed by humans. Since most parts of many types of animals are edible, there is a vast variety of meats. Meat is a major source of protein, as well as iron, zinc, and vitamin B12. Meats, poultry, and fish include beef, chicken, pork, salmon, tuna, and shrimp and eggs. However, since many of the same nutrients found in meat can also be found in foods like eggs, dry beans, and nuts, such foods are typically placed in the same category as meats, as meat alternatives. These include tofu, products that resemble meat or fish but are made with soy, eggs, and cheeses. The meat group is one of the major compacted food groups in the food guide pyramid.

Although meats provide energy and nutrients, they are often high in fat and cholesterol, and can be high in sodium. Simply trimming off fatty tissue can go a long way towards reducing this negative effect. However, this tactic may prove to be ineffective, so large portions of meats are not recommended; two to three ounces per day of meat or alternatives are recommended. This is three to five servings. For those who are ethically opposed (see Vegetarianism and Taboo food and drink) to consuming meat or animal products, meat analogues, tofu, beans, lentils, chickpeas, nuts and other high-protein vegetables make up this food group.

To many nutritional experts (e.g. Walter Wilett), the 1992 pyramid did not reflect the latest research on dietetics. Certain dietary choices that have been linked to heart disease, such as three cups of whole milk and an 8 oz. serving of hamburger daily, were technically permitted under the pyramid. The major points of criticism have been the pyramid's lack of differentiation within the protein-rich group ("Meat, Poultry, Fish, Dry Beans, Eggs, and Nuts"), some lack of clarity with regard to recommended serving sizes and the pyramid's lack of emphasis on whole grains. Some of the recommended quantities for the different types of food in the old pyramid have also come under criticism for lack of clarity. For instance, the pyramid recommends two to three servings from the protein-rich group, but this is intended to be a maximum. The pyramid recommends two to four fruit servings, but this is intended to be a minimum. Another problem is that the pyramid does not distinguish between whole grains and refined grains. Since some vegetarian diets tend to be based on refined grains, it can skew perceptions significantly.

In this generation of obesity, weight loss control is a private matter; and people are becoming more and more dependant upon weight loss programs, or tools to help them lose weight. However, current weight loss programs and tools are not easily available and conveniently displayed. Accordingly, there exists a need for a dish coding system and method that solves one or more of the problems herein described, or that may come to the attention of one skilled in the art after becoming familiar with this specification. Some improvements have been made in the field. Examples of references related to the present invention are described below, and the supported teachings of each reference are incorporated by reference herein:

U.S. Pat. No. 6,296,488, issued to Brenkus et al., discloses a diet method which is designed to provide the user with a balanced diet while restricting the caloric intake by controlling the portion size in a simple and convenient manner. The method employs an apparatus which is preferably in the shape of a plate comprising a plurality of compartments which are designed to enclose a specified volume of food. The apparatus is used with associated meal cards having a variety of foods listed thereon. The foods are listed in specific sections on the card which correspond to the compartments of the apparatus. The meal cards are positioned such that the food list for a particular compartment fits in the shape of the compartment such that the user can see the selectable food items which may be used to fill the corresponding compartment. The user is provided with a simple method in which they do not have to weigh or measure the food amount, no calculating or recording is required, and decks of individual food items do not need to be bothered with.

U.S. Pat. No. 5,560,653, issued to Beppu, discloses a dietary dish used for a person who must diet due to disease, such as diabetes, is disclosed. This dietary dish comprises at least one actual size photograph or detailed illustration of the foods to be served, printed on the bottom surface.

U.S. Pat. No. 4,966,295, issued to Parrish, discloses a dieting plate arrangement is set forth utilizing a compartmentalized dish provided with compartments of predetermined fluid capacity consistent with dieting portions of weight conscious individuals. The plate includes a further scale on one or more of the compartments for indication of quantity based upon varying density of fluid positioned within the compartments. A removable divider includes partition walls securable within the plate, wherein the partition walls may include walls formed of a hollow chamber, a fluid chamber, or a combination thereof to accommodate various dishes of various temperature radiance. A further embodiment includes a central hub formed with cylindrical recesses to accommodate cylindrical terminal ends of divider walls to enable selective division when the divider walls and central hub are positioned within the plate.

U.S. Pat. No. 7,044,739, issued to Matson, discloses a system for and a method of modifying eating habits of a user. The system and method utilize a set of fixed volume containers that are graduated to provide a user means to control the volume of food consumed over time. In accordance with the instant invention, the contents of the containers are consumed over time according to a schedule which identifies the appropriate containers and the frequency of the meals to be consumed each day. Preferably, the method of the instant invention is utilized for weight reduction, wherein the volume of food consumed per meal is reduced over time while frequency of meals consumed over time is simultaneously increased over time in order to balance the nutritional intake of the user. The fixed volume containers can be pre-filled or provide the user with a measuring means to portion his/her own food. The system and method can be customized to suit the dietary goals of an individual and can be used along with a printed and/or electronic schedule and/or a workbook to further motivate the user to modify his/her eating habits to achieve a set of user goals.

U.S. Patent Application Publication No.: 2007/0245825, by Curtis, discloses a "portion-smart" graduated container enables a user to accurately measure dietary portions and consume the same from the "portion-smart" container. The graduated container comprises an inner container surface, an outer container surface, a container rim, a container bottom, and a container wall. The inner container surface at the container wall comprises graduated markings and is designed to receive dietary portions intermediate the container rim, container wall, and container bottom. The graduated markings are user-viewable via the container rim for enabling the user to volumetrically measure received dietary portions. The dietary portions are removable from the graduated container during a mealtime and the "portion-smart" graduated container thus enables the user to dole out dietary portions.

The inventions heretofore known suffer from a number of disadvantages which include being difficult to use, being ineffective, being inefficient, being burdensome to use, being expensive, being limited in application, being limited in adaptability, and being unduly complex.

What is needed is a dish coding system that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available dish coding systems. Accordingly, the present invention has been developed to provide an effective dish coding system to help control food intake portions In one embodiment of the invention, there is a dish coding system configured to discreetly represent serving portions on a dish. The dish coding system may include a dish, configured to support food thereon; and a plurality of decorative indicia visibly disposed across a top portion of the dish. The plurality of decorative indicia does not include any overt indication of a relationship between a decorative indicia characteristic and intended portions to be disposed thereon. The plurality of decorative indicia may include a plurality of surface shape variations to differentiate food serving portions. In addition, the plurality of decorative indicia may include a plurality of colors to differentiate food serving portions. Furthermore, the plurality of decorative indicia may include a plurality of shape displays to differentiate food serving portions. The plurality of decorative indicia may also include a set of themed designs configured to differentiate food serving portions. Moreover, the plurality of decorative indicia may include an indicator disposed on the top surface of the dish, configured to differentiate food serving portions.

The dish coding system may also include an index associated with the dish and including an overt indication of a relationship between decorative indicia characteristics and intended portions to be disposed thereon. The index may be visibly displayed on a bottom surface of the dish. The dish may be selected from the group consisting of: plates, bowls, glasses, cookware, pots, pans, cups, and dishes. The dish may be incorporated into a complete set of dinnerware. In addition, the index may be displayed on a card or paper, separate from the dish, and still configured to perform its intended function.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
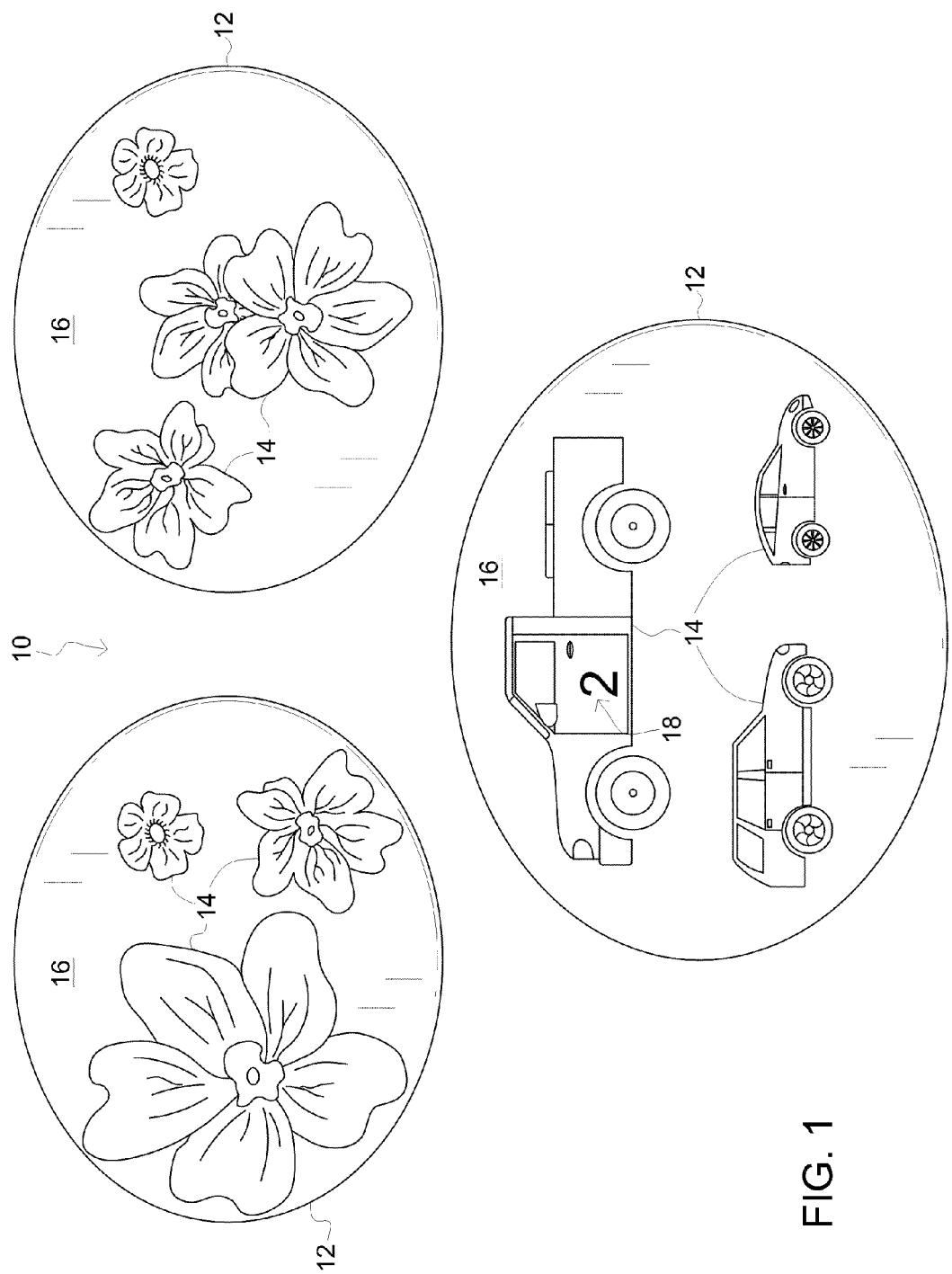
FIG. 1 is a top plan view of a plurality of dishes of a dish coding system, according to one embodiment of the invention.

For the purposes of promoting an understanding of the principles of the invention, reference will now be made to the exemplary embodiments illustrated in the drawing(s), and specific language will be used to describe the same. It will, nevertheless, be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a top plan view of a plurality of dishes of a dish coding system, according to one embodiment of the invention. As illustrated there is a dish coding system 10 configured to discreetly represent serving portions on a dish 12. The dish 12 is configured to support food thereon and also include a plurality of decorative indicia 14 visibly disposed across a top portion 16 of the dish 12. As illustrated in FIG. 1, the plurality of decorative indicia includes a floral design and an automobile design; one skilled in the art would appreciate that the decorative indicia may include a plurality of designs and still perform its intended function. The plurality of decorative indicia 14 does not include any overt indication of a relationship between a decorative indicia characteristic and intended portions to be disposed thereon. The plurality of decorative indicia 14 includes a plurality of surface shape variations to differentiate food serving portions. In addition, the plurality of decorative indicia may include a plurality of colors to differentiate food serving portions. Furthermore, the plurality of decorative indicia may include a plurality of shape displays to differentiate food serving portions. The plurality of decorative indicia may also include a set of themed designs configured to differentiate food serving portions. Moreover, the plurality of decorative indicia may also include an indicator 18 disposed on the top surface 16 of the dish 12, configured to differentiate food serving portions.

In operation of one embodiment of the illustrated invention, a user prepares food and serves the food on a plurality of dishes. The user views a code disposed on the bottom surface of the dish or views a code disposed on a card separate from the dish and serves food corresponding to the code, on the design disposed on the top surface of the dish. The user places one cup of food about the middle sized indicia on the dish. The user may then place a one-half cup serving about the small sized indicia on the dish. Furthermore, the user may plate a meat serving about the large sized indicia of the dish. The dish design is configured to discreetly portion the amount of food served per meal. The portion amounts relate to the suggested amount of food per food group as recommended by the food pyramid.

Figure 2:
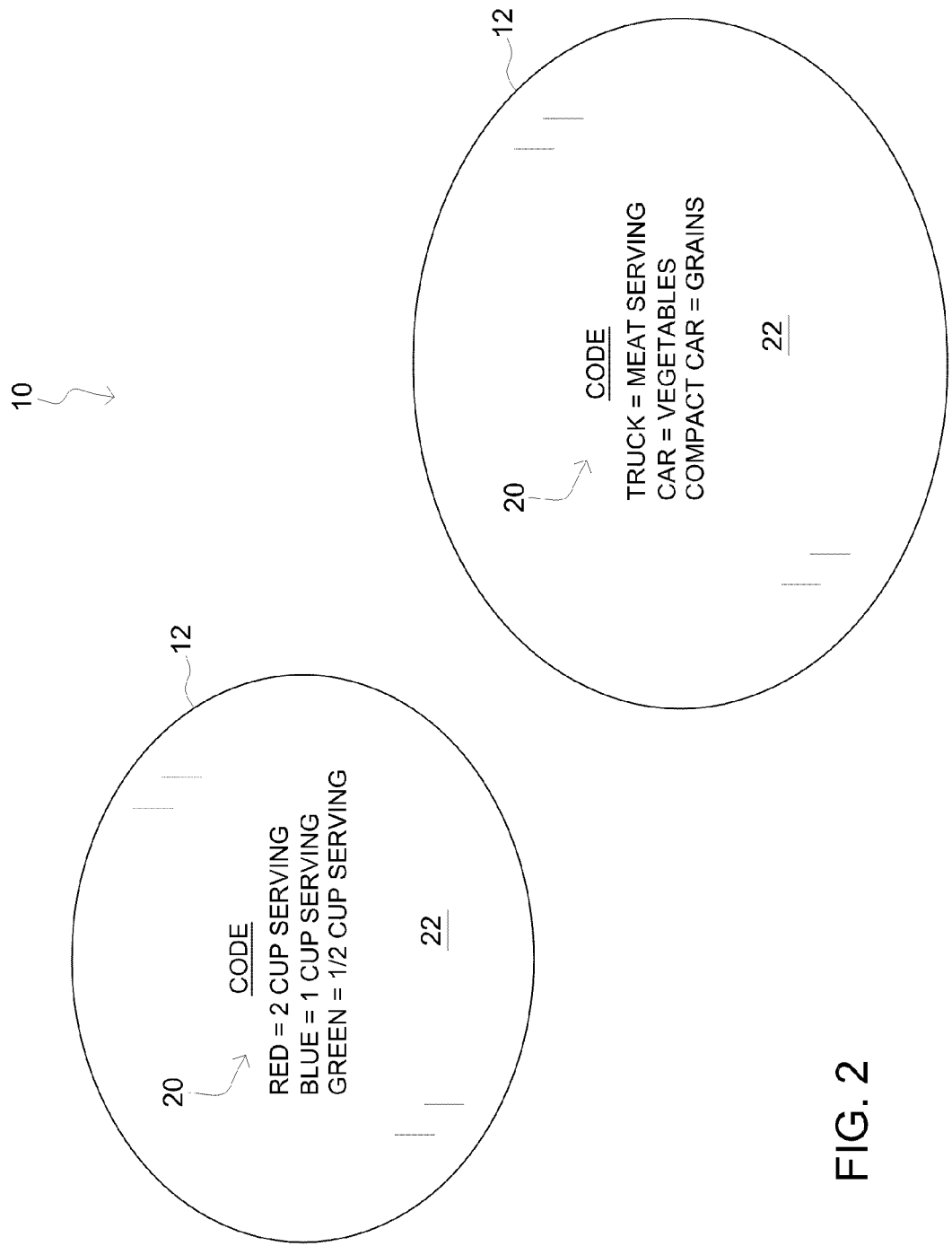
FIG. 2 is a bottom plan view of a plurality of dishes of a dish coding system, according to one embodiment of the invention.

FIG. 2 is a bottom plan view of a plurality of dishes of a dish coding system, according to one embodiment of the invention. As illustrated, there is a dish coding system 10 configured to discreetly represent serving portions on a dish 12. The dish is configured to support food thereon and may also include a plurality of decorative indicia visibly disposed across a top portion of the dish 12. The plurality of decorative indicia does not include any overt indication of a relationship between a decorative indicia characteristic and intended portions to be disposed thereon. The dish coding system 10 also includes an index 20 associated with the dish 12 and including an overt indication of a relationship between decorative indicia characteristics and intended portions to be disposed thereon. The index 20 is visibly displayed on a bottom surface 22 of the dish 12.

In operation of one embodiment of the illustrated invention, a user prepares food and serves the food on a plurality of dishes. The user views a code disposed on the bottom surface of the dish and serves food corresponding to the code, on the design disposed on the top surface of the dish. The user places one cup of food about the middle sized indicia on the dish. The user may then place a one-half cup serving about the small sized indicia on the dish. Furthermore, the user may place a meat serving about the large sized indicia of the dish. A vegetable serving about the middle sized indicia of the dish and a grain serving on the small sized indicia. The dish design is configured to discreetly portion the amount of food served per meal. The portion amounts relate to the suggested amount of food per food group as recommended by the food pyramid.

Figure 3:
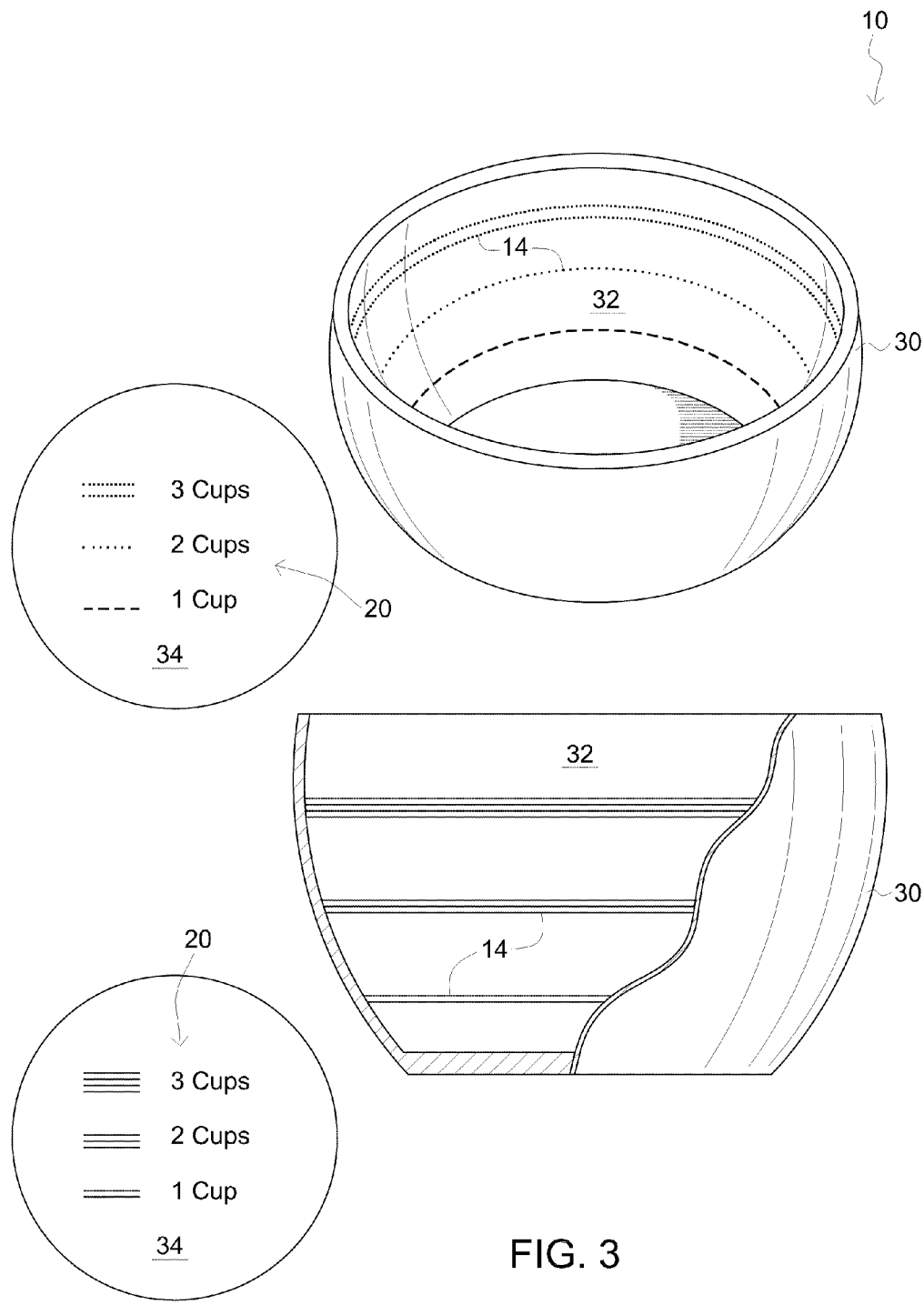
FIG. 3 is a perspective view and a side cross-sectional view of a bowl of a dish coding system, according to one embodiment of the invention.

FIG. 3 is a perspective view, a side cross-sectional view, and a bottom plan view of a bowl of a dish coding system, according to one embodiment of the invention. There is a dish coding system 10 configured to discreetly represent serving portions on a dish. As illustrated in FIG. 3 the dish is a bowl 30 configured to support food therein. The bowl 30 includes a plurality of decorative indicia 14 visibly disposed across a top portion 32 of the bowl 30. The plurality of decorative indicia does not include any overt indication of a relationship between a decorative indicia characteristic and intended portions to be disposed thereon. The dish coding system 10 also included an index 20 associated with the bowl 30 and including an overt indication of a relationship between decorative indicia characteristics and intended portions to be disposed therein. The index 20 is visibly displayed on a bottom surface 34 of the bowl 30.

In operation of one embodiment of the illustrated invention, a user prepares food and serves the food in a bowl. The user views a code disposed on the bottom surface of the bowl and serves food corresponding to the code, on the design disposed on the top surface of the bowl. The user places one cup of food about to the first level of indicia on the bowl. The user then places another cup of food about to the second level of indicia on the bowl. Furthermore, the user then places another cup of food about to the third level of indicia of the bowl. The bowl design is configured to discreetly portion the amount of food served per meal. The portion amounts relate to the suggested amount of food per food group as recommended by the food pyramid.

Figure 4:
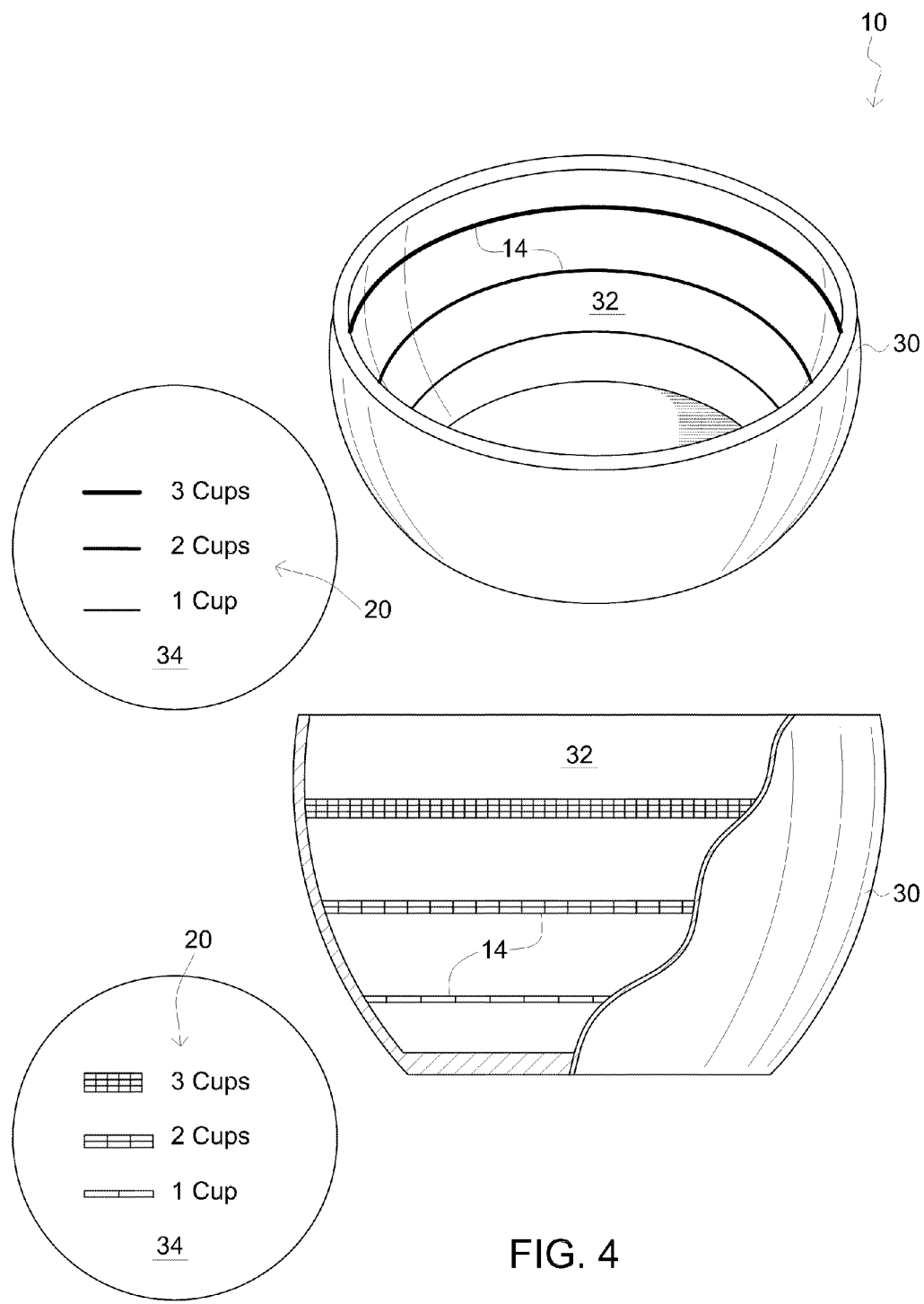
FIG. 4 is a perspective view and a side cross-sectional view of a bowl of a dish coding system, according to one embodiment of the invention.

FIG. 4 is a perspective view, a side cross-sectional view, and a bottom plan view of a bowl of a dish coding system, according to one embodiment of the invention. There is a dish coding system 10 configured to discreetly represent serving portions on a dish. As illustrated in FIG. 3 the dish is a bowl 30 configured to support food therein. The bowl 30 includes a plurality of decorative indicia 14 visibly disposed across a top portion 32 of the bowl 30. The plurality of decorative indicia does not include any overt indication of a relationship between a decorative indicia characteristic and intended portions to be disposed thereon. The dish coding system 10 also included an index 20 associated with the bowl 30 and including an overt indication of a relationship between decorative indicia characteristics and intended portions to be disposed therein. The index 20 is visibly displayed on a bottom surface 34 of the bowl 30.

In operation of one embodiment of the illustrated invention, a user prepares food and serves the food in a bowl. The user views a code disposed on the bottom surface of the bowl and serves food corresponding to the code, on the design disposed on the top surface of the bowl. The user places one cup of food about to the first level of indicia on the bowl. The user then places another cup of food about to the second level of indicia on the bowl. Furthermore, the user then places another cup of food about to the third level of indicia of the bowl. The bowl design is configured to discreetly portion the amount of food served per meal. The portion amounts relate to the suggested amount of food per food group as recommended by the food pyramid.

Figure 5:
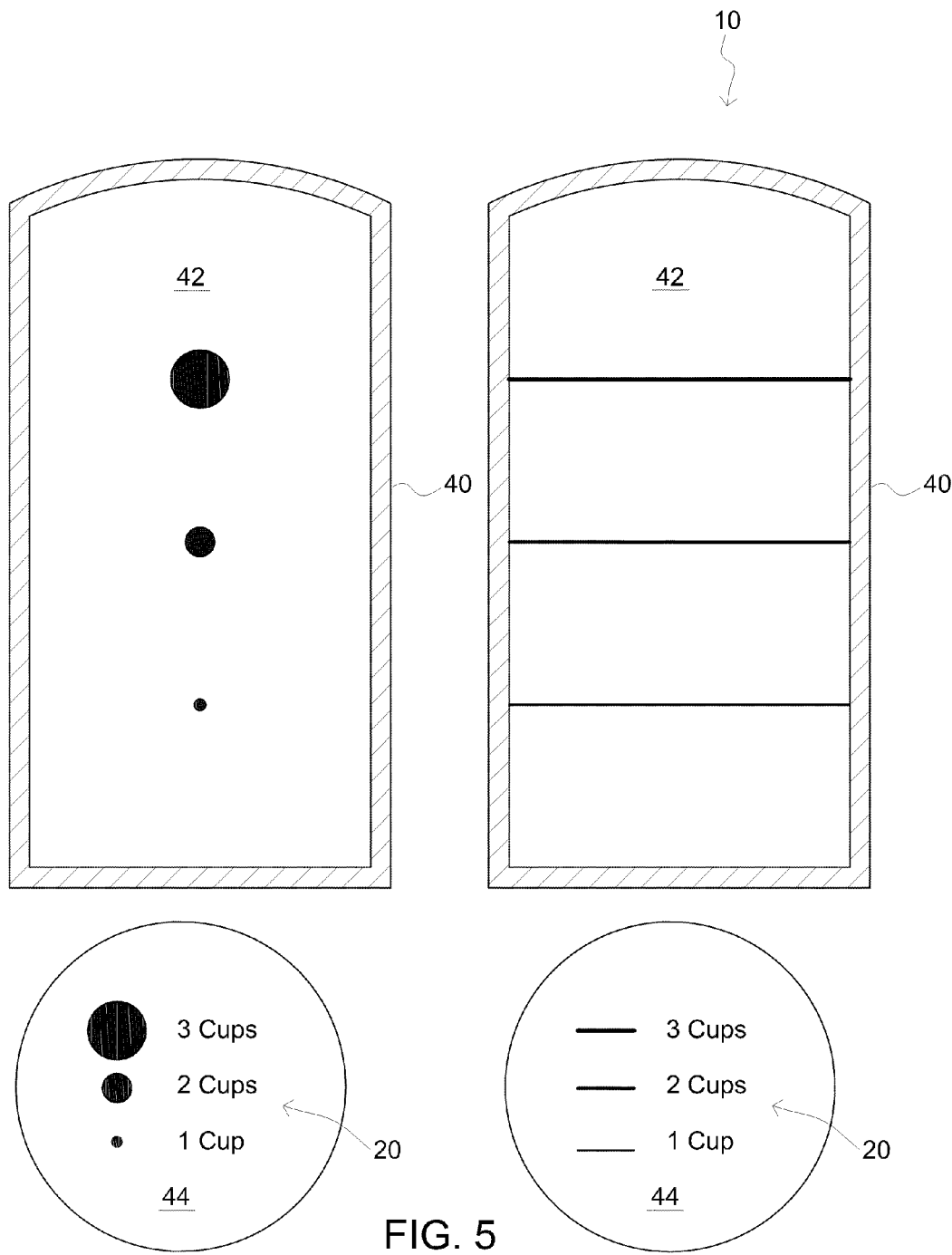
FIG. 5 is a cross-sectional view of a glass of a dish coding system, according to one embodiment of the invention.

FIG. 5 is a cross-sectional view and a bottom plan view of a glass of a dish coding system, according to one embodiment of the invention. There is a dish coding system 10 configured to discreetly represent serving portions on a dish. As illustrated in FIG. 5, the dish is a glass 40, configured to support food therein. The glass includes a plurality of decorative indicia 14 visibly disposed across a top portion 42 of the glass 40. The plurality of decorative indicia 14 does not include any overt indication of a relationship between a decorative indicia characteristic and intended portions to be disposed thereon. The dish coding system 10 also includes an index 20 associated with the glass 40 and including an overt indication of a relationship between decorative indicia characteristics and intended portions to be disposed therein. The index 20 is visibly displayed on a bottom surface 44 of the glass 40.

In operation of one embodiment of the illustrated invention, a user prepares liquid and serves the liquid in a glass. The user views a code disposed on the bottom surface of the glass and serves liquid corresponding to the code, on the design disposed on the top surface of the glass. The user places one-half cup of liquid about to the first level of indicia on the glass. The user then places another one half cup of liquid about to the second level of indicia on the glass. In addition, the user then places another cup of liquid about to the third level of indicia of the glass. Furthermore, the user may place one cup of liquid about to the first dot of indicia on the glass. The user then places another cup of liquid about to the second dot of indicia on the glass. Moreover, the user then places another cup of liquid about to the third dot of indicia of the glass. The glass design is configured to discreetly portion the amount of liquid served per meal. The portion amounts relate to the suggested amount of liquid per food group as recommended by the food pyramid.

Figure 6:
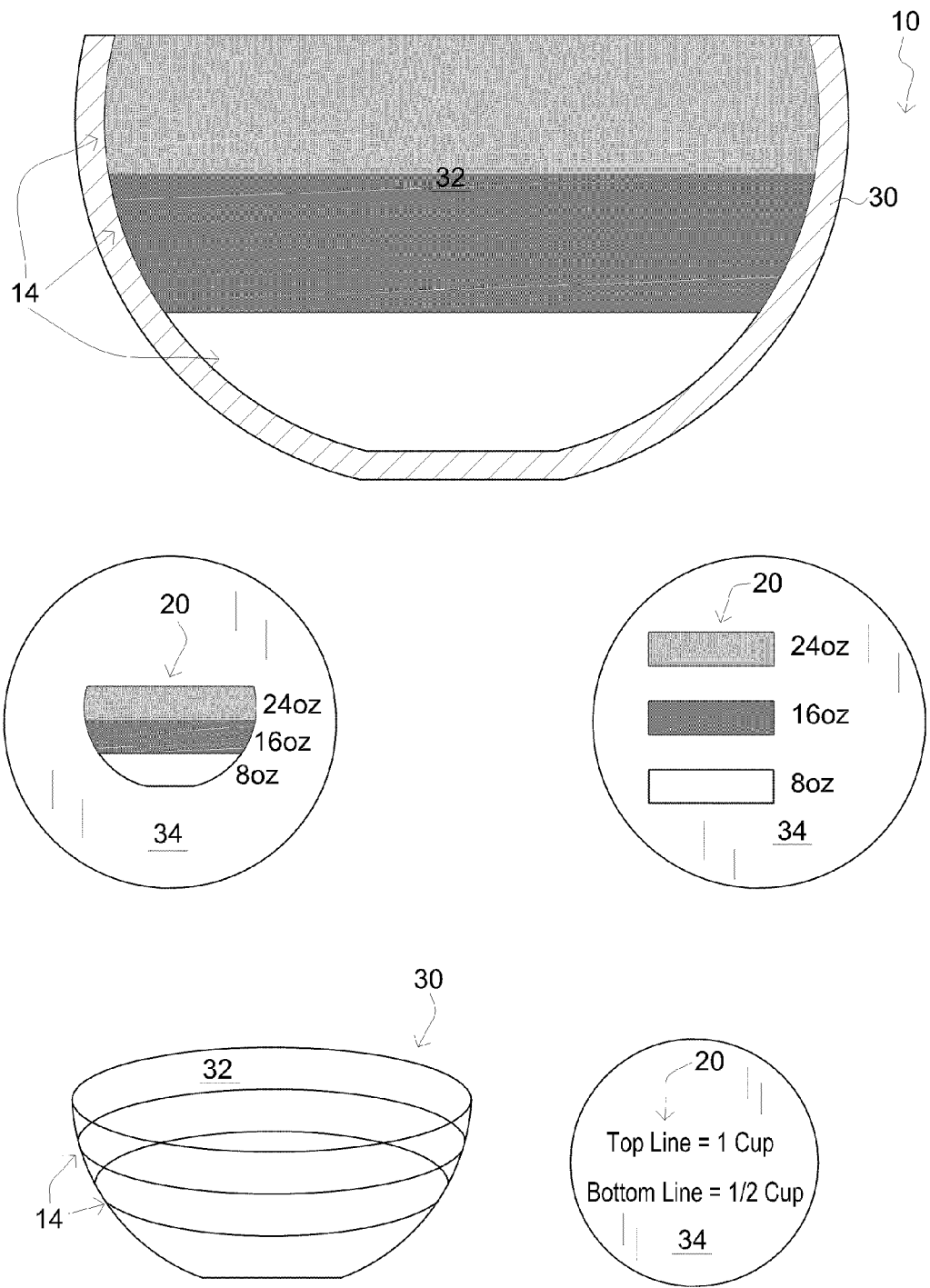
FIG. 6 is a side elevational view, a bottom plan view and a perspective view of a bowl of a dish coding system, according to one embodiment of the invention.

FIG. 6 is a side elevational view, a bottom plan view and a perspective view of a bowl of a dish coding system, according to one embodiment of the invention. There is a dish coding system 10 configured to discreetly represent serving portions on a dish. As illustrated in FIG. 6 the dish is a bowl 30 configured to support food therein. The bowl 30 includes a plurality of decorative indicia 14 visibly disposed across a top portion 32 of the bowl 30. The plurality of decorative indicia 14 does not include any overt indication of a relationship between a decorative indicia characteristic and intended portions to be disposed thereon. The dish coding system 10 also included an index 20 associated with the bowl 30 and including an overt indication of a relationship between decorative indicia characteristics and intended portions to be disposed therein. The index 20 is visibly displayed on a bottom surface 34 of the bowl 30.

In operation of one embodiment of the illustrated invention, a user prepares food and serves the food in a bowl. The user views a code disposed on the bottom surface of the bowl and serves food corresponding to the code, on the design disposed on the top surface of the bowl. The user places one cup of food about to the first level of indicia on the bowl. The user then places another cup of food about to the second level of indicia on the bowl. Furthermore, the user then places another cup of food about to the third level of indicia of the bowl. The bowl design is configured to discreetly portion the amount of food served per meal. The portion amounts relate to the suggested amount of food per food group as recommended by the food pyramid.

Figure 7:
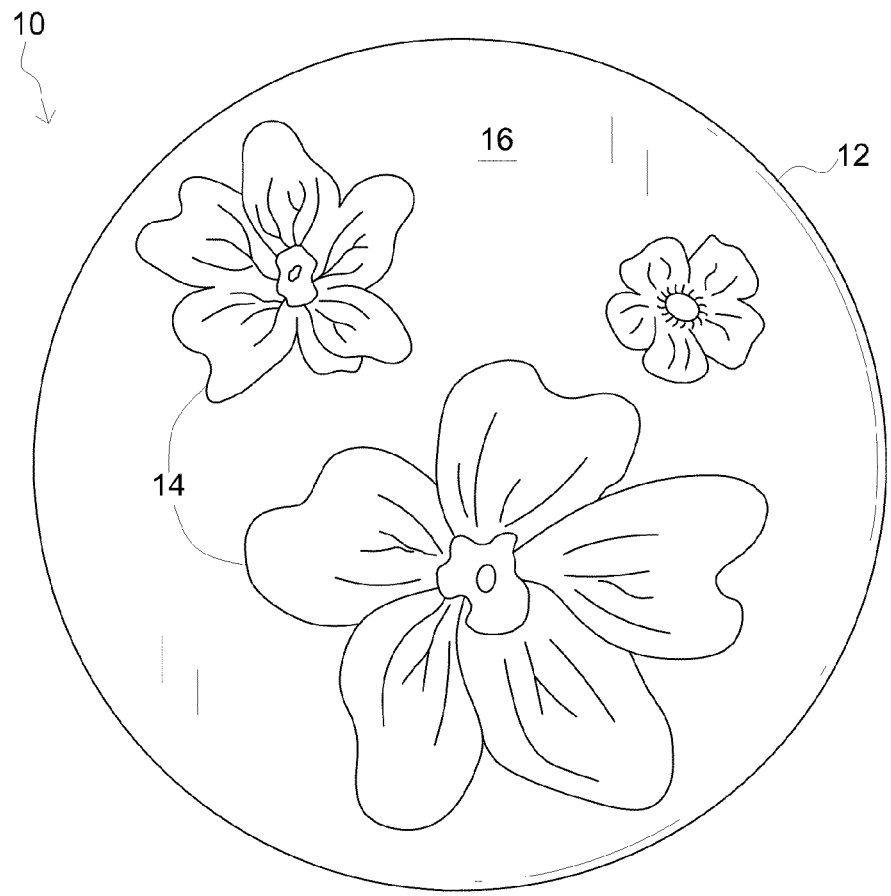
FIG. 7 is a top plan view and a bottom plan view of a dish of a dish coding system and a top plan view of an index card, according to one embodiment of the invention.
Figure 7:
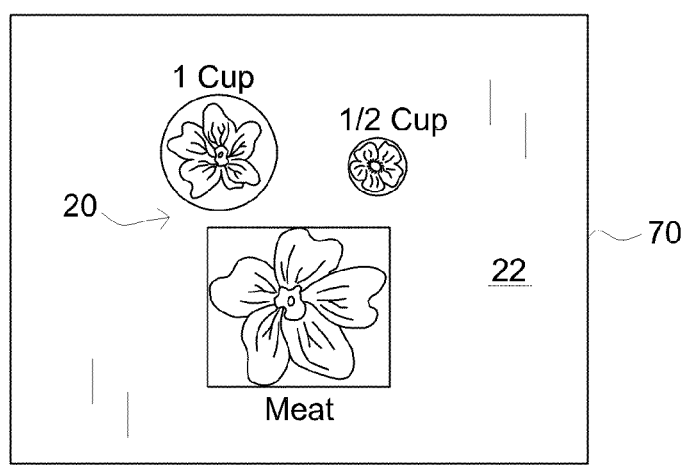

FIG. 7 is a top plan view of a dish of a dish coding system and a top plan view of an index card, according to one embodiment of the invention. As illustrated there is a dish coding system 10 configured to discreetly represent serving portions on a dish 12. The dish 12 is configured to support food thereon and also include a plurality of decorative indicia 14 visibly disposed across a top portion 16 of the dish 12. The plurality of decorative indicia 14 does not include any overt indication of a relationship between a decorative indicia characteristic and intended portions to be disposed thereon. The dish coding system 10 also includes an index 20 associated with the dish 12 and including an overt indication of a relationship between decorative indicia characteristics and intended portions to be disposed thereon. As illustrated in FIG. 7, the index 20 is disposed on a index card 70 separate from the dish 12.

In operation of one embodiment of the illustrated invention, a user prepares food and serves the food on a plurality of dishes. The user views a code on the index card and serves food corresponding to the code, on the design disposed on the top surface of the dish. The user places one cup of food about the middle sized indicia on the dish. The user may then place a one-half cup serving about the small sized indicia on the dish. Furthermore, the user may place a meat serving about the large sized indicia of the dish. The dish design is configured to discreetly portion the amount of food served per meal. The portion amounts relate to the suggested amount of food per food group as recommended by the food pyramid.

Figure 8:
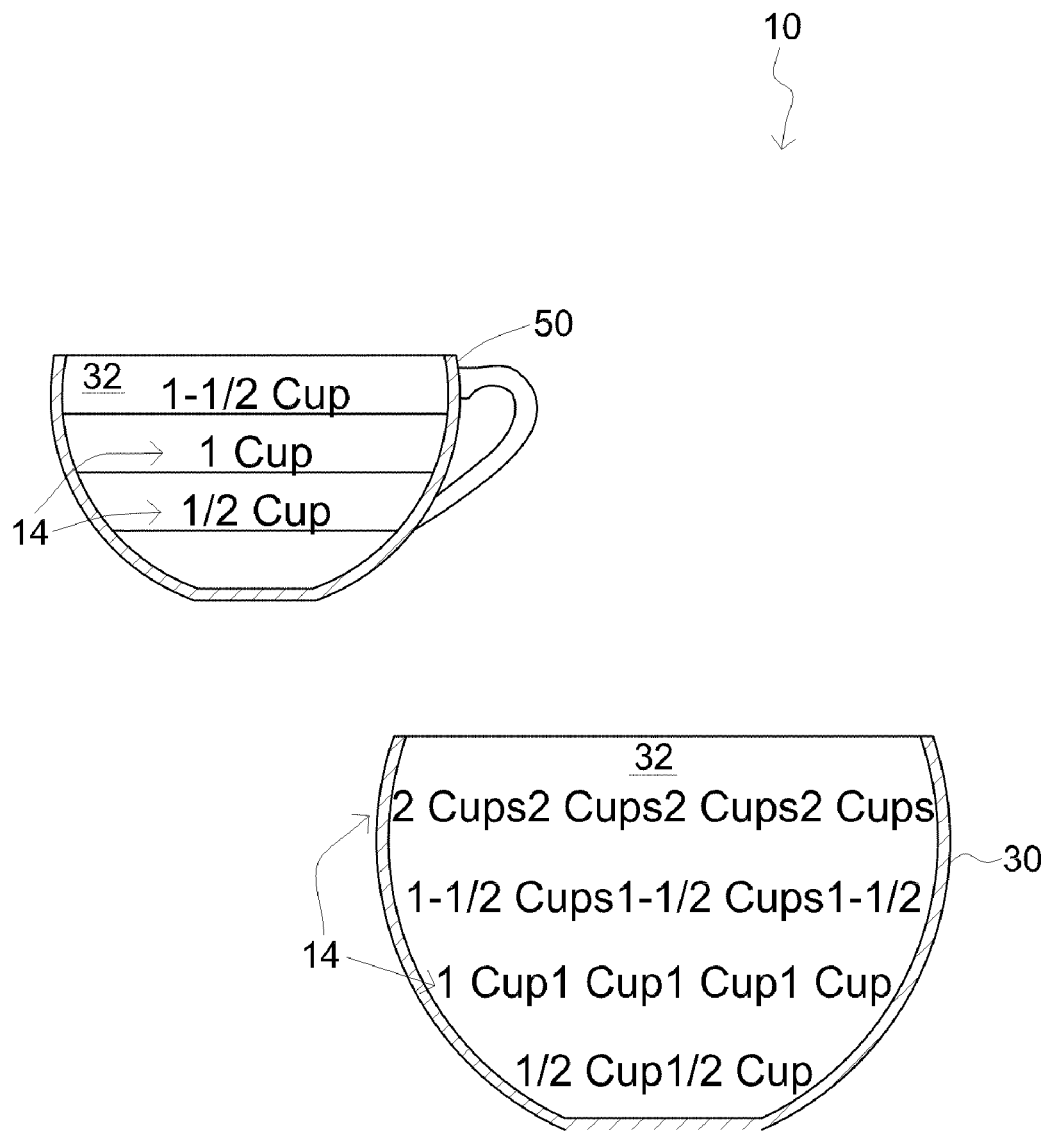
FIG. 8 is a side elevational view of a cup and bowl, and a top plan view of a plate of a dish coding system, according to one embodiment of the invention.
Figure 9:
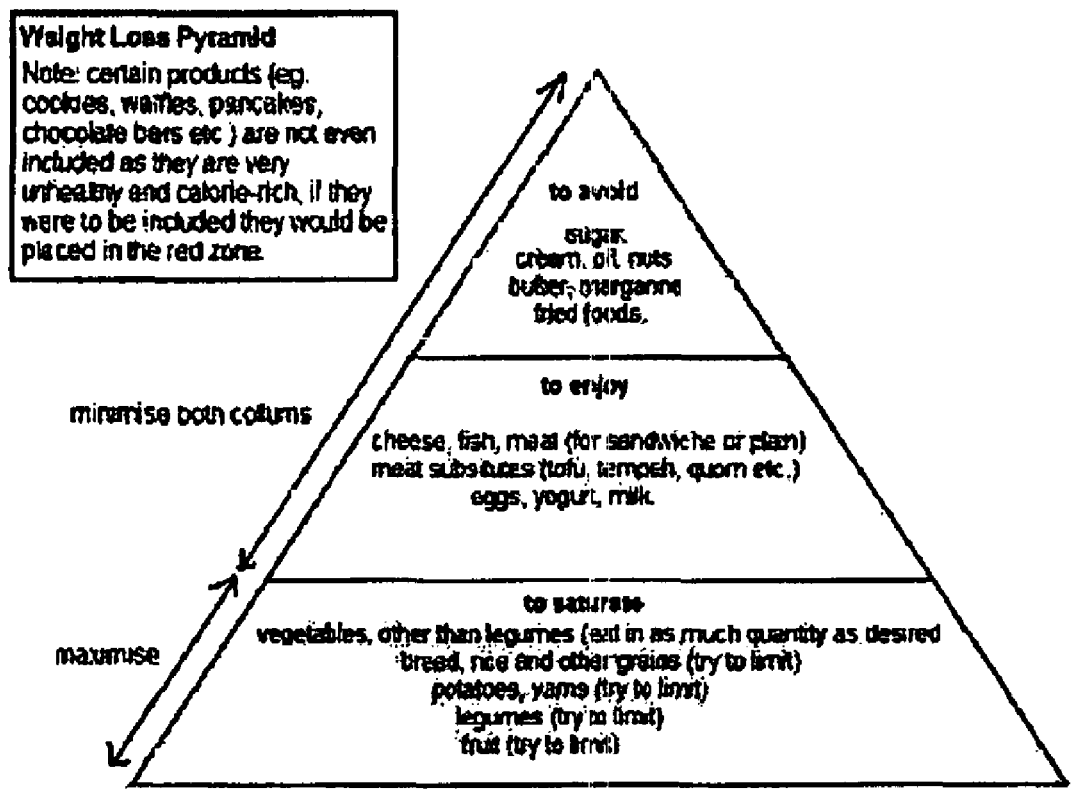
FIG. 9 is a graphical view of a weight loss pyramid made on the model by BCM.

FIG. 8 is a side cross-sectional view of a cup and bowl of a dish coding system, according to one embodiment of the invention. There is a dish coding system 10 configured to discreetly represent serving portions on a dish. As illustrated in FIG. 8 the dish is a bowl 30 and a cup 50 configured to support food therein. The bowl 30 and cup 50 include a plurality of decorative indicia 14 visibly disposed across a top portion 32 of the bowl 30 and cup 50. The plurality of decorative indicia 14 does not include any overt indication of a relationship between a decorative indicia characteristic and intended portions to be disposed thereon. The dish coding system 10 also included an index associated with the bowl 30 and cup 50 and includes an overt indication of a relationship between decorative indicia characteristics and intended portions to be disposed therein. The index may be visibly displayed on a bottom surface of the bowl or cup.

In operation of one embodiment of the illustrated invention, a user prepares food and serves the food in a bowl. The user views a code disposed on the bottom surface of the bowl or cup and serves food corresponding to the code, on the design disposed on the top surface of the bowl or cup. The user places one cup of food about to the first level of indicia on the bowl or cup. The user then places another cup of food about to the second level of indicia on the bowl or cup. Furthermore, the user then places another cup of food about to the third level of indicia of the bowl or cup. The bowl and cup design is configured to discreetly portion the amount of food served per meal. The portion amounts relate to the suggested amount of food per food group as recommended by the food pyramid.

According to one embodiment of the invention, there is a dish coding system including a dish. The dish includes a coding system, wherein the color of the design indicates the portion amount of food that should be served. The color corresponds to the portion amount recommended by the food pyramid. As illustrated on the top surface of the dish, the color blue is configured to represent a one cup serving. The color green is configured to represent a one-half cup serving. In addition, the color yellow is configured represents a meat serving. Furthermore, the color red is configured to represent a two cup serving.

The color design is configured to enable the portioning of food without indicating that the dish is designed to do so. The dish is configured to provide discreet portion amounts regarding the food intake and the food pyramid suggestions. Furthermore, a code is disposed about the bottom surface of the dish, wherein the code is configured to represent serving sizes related to the design disposed on the top surface of the dish. One skilled in the art would appreciate that the coding system may vary; one non-limiting example may be that the design, not the color, that corresponds to the portion amount. This variation may be displayed on the code disposed about the bottom surface of the dish.

In another embodiment of the invention, a red flower is disposed about one-half of the dish, a blue flower is disposed about one-quarter of the dish and a green flower is disposed about one-fifth of the dish. In addition to the color coding, one skilled in the art would appreciate that the coding system may incorporate the size of the design illustrated about the top surface of the dish. The red flower may represent a two cup serving, the blue flower may represent a one cup serving, and the green flower may represent a one-half cup serving.

In operation of one embodiment of the dish coding system, a user prepares food and serves the food on the dishes. The user views the code disposed on the bottom surface of the dish and serves food corresponding to the code on the design disposed on the top surface of the dish. The user places one cup of food about the blue color on the dish. The user may then place a one-half cup serving about the green color on the dish. Furthermore, the user may plate a meat serving about the yellow color of the dish. The dish design is configured to discreetly portion the amount of food served per meal. The portion amounts relate to the suggested amount of food per food group as recommended by the food pyramid.

In yet another embodiment of the invention, the dish coding system includes a bowl, wherein the bowl is configured to indicate a portion amount of food. The system includes a plurality of bumps, wherein the plurality of bumps is configured to represent the portion amount of food. In addition, the plurality of bumps may also be configured by color, wherein blue equals one cup, green equals one-half cup, and so forth. The bowl includes a plurality of ridges, wherein the ridges are configured to measure the amount of food served for that particular meal. Furthermore, the ridges may also be configured by color, wherein blue equals one cup, green equals one-half cup, and so forth.

In addition, the bowl includes a code disposed about the bottom surface of the bowl, wherein the code is configured to represent serving sizes related to the design disposed on the interior surface of the bowl. One skilled in the art would appreciate that the design may vary, non-limiting examples may include: bumps, ridges, designs, configurations, colors, symbols, and still perform its intended function. The design may include but are not limited to: flowers, cars, animals, fruits, vegetables, articles of clothing, sports related items, etc. and still perform its intended function.

In operation of the dish coding system and method, according to one embodiment of the invention, a user views the bottom surface of the bowl and may fill the bowl to the lowest plurality of bumps or ridges with a liquid, i.e. milk. The user may then add a food to the bowl, i.e. cereal, to the next plurality of bumps or ridges. The user may portion the amount of food served in the bowl by correlating the desired amount of food to the code disposed on the bottom surface of the bowl.

In yet another embodiment of the invention, the dish coding system includes a code disposed on the bottom surface of a dish. The code is configured to correlate to the design disposed on the top surface of the dish. The code disposed on the bottom surface corresponds to the design disposed on the top surface of the dish, the red color corresponds to a two cup serving, the blue color to a one cup serving, and the green color configured to correspond to a one-half cup serving. In addition to color, the code may vary according to the design disposed on the top surface of a dish.

The code disposed on the bottom surface corresponds to the design disposed on the top surface, the truck represents a meat serving, the car represents a one cup serving, and the compact car represents a one-half cup serving. One skilled in the art would appreciate that the code may vary, non-limiting examples may be that the code may include a design, as described above, wherein the design may be flowers, cars, animals, fruits, vegetables, articles of clothing, sports related items, etc. Thereby, the designs represent a portion amount of food to be disposed about the top surface of the dish, wherein a flower may represent a one cup portion amount, a car may represent a meat serving, a fruit may represent a one-half cup portion amount, etc., wherein the code may still perform its intended function.

In yet another embodiment of the invention, a dish coding system includes a bowl. The bowl is configured to indicate a portion amount of food. The system includes a plurality of lines, wherein the plurality of lines are configured to represent the portion amount of food. The plurality of lines are disposed about an interior surface of the bowl, wherein the lines may be separate or in combination to display the portion amount of food. In addition, the plurality of lines may also be configured by line thickness, wherein a thin line represents one-half cup portion, medium line represents a one cup portion, a thick line representing a one and a half cup portion, and so forth.

The bowl includes a plurality of colored blocks, wherein the color blocks are configured to measure the amount of food served for that particular meal. Furthermore, the blocks may be configured by color, wherein blue equals one cup, green equals one-half cup, and so forth. The plurality of colored blocks may be disposed about the interior surface of the bowl, wherein the may be separate or in combination to display the portion amount of food.

In still another embodiment of the invention, a dish coding system includes a glass. The glass is configured to indicate a portion amount of liquid. The glass includes a plurality of lines, wherein the plurality of lines is configured to represent the portion amount of food. The plurality of lines are disposed about an interior surface of the glass, wherein the lines may be separate, or in combination, to display the portion amount of food. In addition, the plurality of lines may also be configured by line thickness, wherein a thin line represents one-half cup portion, medium line represents a one cup portion, a thick line representing a one and a half cup portion, and so forth.

In yet another embodiment of the invention a dish coding system includes a bowl. The bowl is configured to indicate a portion amount of food. The bowl includes a plurality of colored layers, wherein the colored layers represent the portion amount of food. The plurality of colored layers are disposed about an interior surface of the bowl, wherein the bottom layer may represent an eight ounce portion amount of food, the middle layer may represent a sixteen ounce portion amount of food, and the top layer may represent a twenty-four ounce portion amount of food. The bottom of the bowl includes a code, wherein the code is configured to correlate to the design disposed on the interior surface of the bowl. In addition, the bowl may be transparent, wherein the markings are disposed about the exterior surface of the bowl to represent the portion amount of food.

In yet another embodiment of the invention a dish coding system includes a dish. The dish includes a design disposed about the top surface of the dish and a code disposed about the bottom surface of the dish. The code includes a illustrative code, wherein the design disposed about the top surface of the dish corresponds to the same design disposed about the bottom surface of the dish representing a portion amount of food. The dish may be, but not limited to, a cup, a plate, or a bowl. The dish may include a design configured to represent a portion amount of food. The design includes descriptive language corresponding to the portion amount of food to be disposed about the dish, wherein the design is configured to be ornamental and functional.

EXAMPLES

Examples of a coding system, according to an embodiment, wherein the system includes a dish. Disposed on the top surface of the dish is a design, wherein a code disposed on the bottom surface of the dish corresponds to the design disposed on the top surface of the dish. The design disposed on the top surface of the dish is configured to discreetly represent a portion amount of food to be served.

Example 1 according to one embodiment the system may include a plurality of flowers, wherein the colors of the flowers represent the portion amount of food to be served. The color code is disposed on the bottom surface to indicate the suggested serving size to be placed on the top surface of the dish. The color red may represent a two cup serving; the color yellow may represent a meat serving; the color blue may represent a one cup serving; and a green color may represent a one-half cup serving.

Example 2 according to one embodiment the system may include a plurality of colored blocks. The colored blocks represent the portion amount of food to be served. The code may include the color red, wherein the color red may represent a two cup serving; the color yellow may represent a meat serving; the color blue may represent a one cup serving; and a green color may represent a one-half cup serving.

Example 3 according to one embodiment, wherein the system includes a plurality of race cars. The number disposed on each race car is configured to represent the portion amount of food to be served. A first race car may contain a number, including a one, wherein the number represents a one cup serving. A second race car may contain a number, including a two, wherein the two represents a two cup serving. A third race car may include a zero, wherein the zero may represent a meat serving.

Example 4 according to one embodiment, wherein the system includes a fruit design. The fruit design is configured to represent the portion amount of food. The fruit design may include a grape, an apple, an orange, and a banana. The code, disposed on the bottom surface of the dish may include a grape, wherein the grape represents a one-half cup serving. The code may include an apple configured to represent a one-cup serving; and an orange, wherein the orange is configured to represent a two-cup serving. The code may also include a banana, wherein the banana is configured to represent a meat serving.

Example 5 according to one embodiment, wherein the system includes symbols. The symbols are configured to represent the portion amount of food per serving. The symbols may include a plurality of animals, wherein a particular animal represents the portion amount of food. The animals may include a monkey, a dog, a cat, and a bird. The monkey may represent a meat serving; the dog may represent a two cup serving; the cat may represent a one cup serving; and the bird may represent a one-half cup serving.

Example 6 according to one embodiment, wherein the system includes a dish, a bowl, and a glass. The dish, bowl, and glass each include a particular indicator for representing the portion amount of food. An indicator may be anyone of the Examples listed and/or any system disclosed in the specification. This configuration would enable a user to create an entire meal using the coding and portioning system.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

It is envisioned that the system may include a variety of designs and still perform its intended function. In addition, the above examples may be interchanged and/or include any combination thereof and still perform its intended function. Furthermore, the term "dish" may be, but not limited to, a bowl, a glass, a plate, a saucer, a platter, or any other food serving device and still perform its intended function.

It is also envisioned that the system may include a complete set of dining ware and/or silverware. One example may be that the dish, the bowl, and the glass may all have the same indicators, such as but not limited to; colored blocks, plurality of lines, a plurality of ridges, a plurality of blocks, various color indicators, various design indicators, and symbols that all correlate to a particular coding system.

It is understood that the above-described preferred embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

For example, although the figures illustrate flowers or automobiles, one skilled in the art would appreciate that the dishes may vary in design, configuration, shape, and still perform its intended function.

Additionally, although the figures illustrate a plurality of bumps or ridges, one skilled in the art would appreciate that the colors may vary but still perform its intended function as a decoding device for serving the suggested portion of food per serving by the food pyramid.

It is also envisioned that, one skilled in the art would appreciate that the dish coding system may include a discreet system of dish coding, wherein an indicator may be placed about the dish or bowl to specify the portion amount suggested by the food pyramid. One non-limiting example may be, wherein the system includes an indicator and the indicator is fruit. A grape may represent a one-half cup serving, an orange may represent a one-cup serving, an apple may represent a meat serving. Another non-limiting example may be a discreet number disposed about the dish or bowl. As illustrated in FIG. 2, the automobile may include a discreet numbering system, wherein the food serving corresponds to the discreet numbering system.

It is expected that there could be numerous variations of the design of this invention. An example is that the indicators may vary; examples are, but are not limited to; fruit, automobiles, letters, numbers, colors, symbols, and still perform its intended function.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use, may be made without departing from the principles and concepts of the invention as set forth in the claims. Further, it is contemplated that an embodiment may be limited to consist of, or to consist essentially of, one or more of the features, functions, structures, methods described herein.

What is claimed is:

1. A dish coding system, configured to discreetly represent serving portions on a dish, comprising:
   a. a dish, configured to support food thereon;
   b. a plurality of decorative indicia visibly disposed across a top portion of the dish, wherein the plurality of decorative indicia does not include any overt indication of a relationship between a decorative indicia characteristic and intended portions to be disposed thereon; and
   c. an index associated with the dish and including an overt indication of a relationship between decorative indicia characteristics and intended portions to be disposed thereon; wherein the index is visibly displayed on a bottom surface of the dish.

2. The dish coding system of claim 1, wherein the plurality of decorative indicia includes a plurality of surface shape variations to differentiate food serving portions.

3. The dish coding system of claim 1, wherein the plurality of decorative indicia includes a plurality of colors to differentiate food serving portions.

4. The dish coding system of claim 1, wherein the plurality of decorative indicia includes a plurality of shape displays to differentiate food serving portions.

5. The dish coding system of claim 1, wherein the plurality of decorative indicia includes a set of themed designs configured to differentiate food serving portions.

6. The dish coding system of claim 1, wherein the plurality of decorative indicia includes an indicator disposed on the top surface of the dish, configured to differentiate food serving portions.

7. The dish coding system of claim 1, wherein the dish is selected from the group consisting of: plates, bowls, glasses, cookware, pots, pans, cups, and dishes.

8. The dish coding system of claim 1, wherein the dish is incorporated into a complete set of dinnerware.

9. A dish coding system, configured to discreetly represent serving portions on a dish, comprising:
   a. a dish, configured to support food thereon; and
   b. a plurality of decorative indicia visibly disposed across a top portion of the dish, wherein the plurality of decorative indicia does not include any overt indication of a relationship between a decorative indicia characteristic and intended portions to be disposed thereon;
   wherein the system further includes an index associated with the dish and including an overt indication of a relationship between decorative indicia characteristics and intended portions to be disposed thereon;
   wherein the plurality of decorative indicia includes a plurality of surface shape variations to differentiate food serving portions;
   wherein the plurality of decorative indicia includes a plurality of colors to differentiate food serving portions;
   wherein the plurality of decorative indicia includes a plurality of shape displays to differentiate food serving portions;
   wherein the plurality of decorative indicia includes a set of themed designs configured to differentiate food serving portions; and
   wherein the plurality of decorative indicia includes an indicator disposed on the top surface of the dish, configured to differentiate food serving portions; wherein the index is visibly displayed on a bottom surface of the dish.

10. The dish coding system of claim 9, wherein the dish is selected from the group consisting of: plates, bowls, glasses, cookware, pots, pans, cups, and dishes.

11. The dish coding system of claim 9, wherein the dish is incorporated into a complete set of dinnerware.

12. A dish coding system, configured to discreetly represent serving portions on a dish, comprising:
   a. a dish, configured to support food thereon; wherein the dish may selected from the group consisting of plates, bowls, glasses, cookware, pots, pans, cups, and dishes; wherein the dish is incorporated into a complete set of dinnerware;
   b. a plurality of decorative indicia visibly disposed across a top portion of the dish, wherein the plurality of decorative indicia does not include any overt indication of a relationship between a decorative indicia characteristic and intended portions to be disposed thereon; wherein the plurality of decorative indicia includes a plurality of surface shape variations to differentiate food serving portions; wherein the plurality of decorative indicia includes a plurality of colors to differentiate food serving portions; wherein the plurality of decorative indicia includes a plurality of shape displays to differentiate food serving portions; wherein the plurality of decorative indicia includes a set of themed designs configured to differentiate food serving portions; wherein the plurality of decorative indicia includes an indicator disposed on the top surface of the dish, configured to differentiate food serving portions; and
   c. an index associated with the dish and including an overt indication of a relationship between decorative indicia characteristics and intended portions to be disposed thereon; wherein the index is visibly displayed on a bottom surface of the dish.

* * * * *